United States Patent [19]

Kumamoto

[11] Patent Number: 5,434,955
[45] Date of Patent: Jul. 18, 1995

[54] FUZZY INFERENCE DEVICE

[75] Inventor: Hiroshi Kumamoto, Nagaokakyo, Japan

[73] Assignee: Omron Corporation, Kyoto, Japan

[21] Appl. No.: 47,369

[22] Filed: Apr. 19, 1993

Related U.S. Application Data

[63] Continuation of Ser. No. 720,152, Jun. 27, 1991, abandoned.

[30] Foreign Application Priority Data

Jun. 28, 1990 [JP] Japan .................................. 2-168493
Aug. 9, 1990 [JP] Japan .................................. 2-209260

[51] Int. Cl.$^6$ .......................................... G06F 15/18
[52] U.S. Cl. ...................................... 395/51; 395/61; 395/900
[58] Field of Search .................. 395/3, 11, 61, 900, 395/51

[56] References Cited

U.S. PATENT DOCUMENTS

| | | | |
|---|---|---|---|
| 4,839,823 | 6/1989 | Matsumoto | 395/911 |
| 4,860,214 | 8/1989 | Matsuda et al. | 395/62 |
| 5,051,932 | 9/1991 | Inoue et al. | 395/11 |
| 5,253,332 | 10/1993 | Kumamoto | 395/51 |

FOREIGN PATENT DOCUMENTS 468530 1/1992 European Pat. Off. ...... G05B 13/00

OTHER PUBLICATIONS

Giles, "The Concept of Grade of Membership," Fuzzy Sets and Systems 25(1988) 297-323.
"Uncertainity Management in Expert Systems," Keung-Chi Ng, et al., IEEE Expert, vol. 5, No. 2, Apr. 1990, New York, pp. 29-48.

*Primary Examiner*—Robert W. Downs
*Attorney, Agent, or Firm*—Dickstein, Shapiro & Morin

[57] ABSTRACT

The present invention is carried out by modifying input data by the degree grade with respect to membership functions. The degree of fit measure is then used to obtain the information amount of each phenomena. A relational coefficient, which indicates the relatedness of a number of phenomena (for example, phenomena linked by an AND), is obtained. The degree of fit, information amount and relational coefficient are then used to determine the possibility of a conclusion. This scheme allows the user to enhance the accuracy of the information amount at the time the data are input. It also enables the user to attain an inference result with high discriminability based upon the relatedness of a number of phenomena with respect to a single conclusion. In another embodiment, the knowledge of expert users expressing the relationships between phenomena and conclusions is stored prior to use of the device. An inference device calculates the possibility of various conclusions and then calculates the clearnesses of the possibilities it has produced. As a result, the device exploits the user's knowledge that a single phenomenon for which a single conclusion is to be drawn may have two or more distinct definitions; and these may be conjoined in an OR relationship or conjoined in an AND relationship. The accuracy of inferences is thus improved and the area in which inferences are applied is broadened.

13 Claims, 9 Drawing Sheets

FUZZY INFERENCE DEVICE

This application is a continuation of application Ser. No. 07/720,152, filed Jun. 27, 1991, now abandoned.

BACKGROUND OF THE INVENTION

1. Field of the Invention

This invention concerns a fuzzy inference device.

2. Background of the Prior Art

Fuzzy inference is well known as a method by which the information amount of a phenomenon, which was used to arrive at an inference, can be used to correct or change the conclusion arrived at by the inference. (See, for example, Zhang Hongmin, "An Expert System with Thinking in Images," *Preprints of the Second IFSA Congress, Tokyo, July 20–25*, 1987, p. 765)

The fuzzy inference method is used to increase the discriminatory capacity of inferences. For each phenomenon, the information amount of that phenomenon (i.e., the capacity of the phenomenon possesses for the discrimination of its information) is determined using a membership function corresponding to each conclusion which may be drawn for that phenomenon. The inference (i.e., the possibility that a conclusion can be drawn) is corrected or changed (by finding the product of the possibility and the information amount) using the information amount of the phenomenon which led to that conclusion.

However, when a number of phenomena are related with respect to a single conclusion, the above inference scheme is unable to reflect their relationship in the inference result. For example, in the case in which a conclusion can be drawn when two phenomena have both occurred (i.e., two phenomena conjoined by AND), a correct inference cannot be made.

Additionally, in existing fuzzy inference schemes, it is assumed that the membership functions for phenomena have a single peak (single-humped function). These schemes cannot handle membership functions with two and three or more peaks in the range of variables, which are known as double-humped and multi-humped functions.

Nor can they handle the knowledge that various discrete phenomena relating to a single conclusion may be conjoined by OR or by AND.

SUMMARY AND OBJECTS OF THE INVENTION

In view of the foregoing, it should be apparent that there still exists a need in the art for a device capable of performing fuzzy inferences which takes into consideration the relationship of a number of phenomena about which a single conclusion is to be drawn.

A further object of the invention is to allow the user to enhance the accuracy of the fuzzy information amount of a phenomenon at the time data are input for the purpose of making an inference. This results in an inference result with high discriminability.

Yet an additional object of the invention is to make use of a relational coefficient to allow the relatedness of a number of phenomena (for example, they might be linked by AND) to be reflected in the inference result. This improves the accuracy of the inference result.

A further object of this invention is to provide a fuzzy inference device which can exploit knowledge which describes phenomena expressed as double-humped or multi-humped membership functions.

Another object of this invention is to provide a fuzzy inference device which can exploit the knowledge that various discrete phenomena relating to a single conclusion may be conjoined in an OR relationship or in an AND relationship.

It is yet an additional object of this invention to calculate the degree of grade, for example, by means of MAX calculation.

It is still an object of this invention to store user knowledge in a form which expresses the fact that data relating to two or more definitions for a single phenomenon may be in an OR relationship.

A phenomenon about which one wishes to draw a single conclusion, but which has two or more definitions conjoined in an OR relationship, can be expressed as a membership function with two or more peaks (a double-humped or multi-humped membership function). This invention allows the degree of grade of this type of phenomenon to be calculated with respect to membership functions. The results of these calculations can be used to obtain the possibilities of various conclusions. Thus, the fuzzy inference device designed according to this invention makes it possible to treat phenomena which can be expressed as double-humped or multi-humped membership functions, and by so doing, broadens the range of applications for fuzzy inference.

Briefly described, these and other objects of the invention are accomplished by providing a fuzzy inference device, according to a first embodiment, having a means to calculate the degree of grade which can modify the input data for the degree of grade using membership functions created according to expert knowledge expressing the relationship between phenomena and a conclusion. The invention is further provided by a means to calculate the fuzzy information amount of each phenomenon using this degree of grade. A device is also provided for calculating the relational coefficient which expresses the relatedness of a number of phenomena according to expert knowledge expressing the relationship between multiple phenomena and a conclusion. The device is further provided by a means to calculate the possibility of a conclusion using the above-mentioned degree of fit, fuzzy information amount and relational coefficient.

In another embodiment according to the apparatus aspects of the invention, the fuzzy inference device is furnished with a means to store, prior to the use of the device, the knowledge of expert users expressing the relationships between phenomena and conclusions, including the case in which a single phenomena, for which a single conclusion is to be drawn, has two or more separate definitions which are conjoined in an OR relationship; a means to calculate the degree of grade of input data to a membership function for a given conclusion, which is to be drawn using the aforementioned knowledge once a definition has been selected for a phenomenon with two or more separate definitions which are conjoined in an OR relationship, by performing specified calculations to determine the grade of the data to each of the various membership functions created by the various definitions so as to establish the grade to each membership; a means to calculate the fuzzy information amount of each phenomenon using the grade which has been calculated; and a means to calculate the possibility of a conclusion using the above-mentioned grade and fuzzy information amount.

The fuzzy inference device of this invention designed according to another embodiment of its apparatus aspects is furnished with a means to store, prior to the use of the device, the knowledge of expert users expressing the relationships between phenomena and conclusions, including the case in which various multiple phenomena, for which a single conclusion is to be drawn, are conjoined in an OR relationship; a means to calculate the grade, which calculates the grade of input data with respect to a membership function for each phenomenon vis-a-vis every conclusion drawn based on the definition of the phenomenon contained in the aforementioned knowledge, and with respect to groups of phenomena conjoined in an OR relationship, performs specified calculations on the grade of phenomena belonging to these groups, and by so doing obtains the grade of the groups; a means to calculate the fuzzy information amount of each phenomenon using the grade which has been calculated; and a means to calculate the possibility of a conclusion using grade, including the aforesaid grade of the groups, and the fuzzy information amount.

In a further embodiment of this invention, the knowledge of expert users expressing relationships between phenomena and conclusions is stored prior to the use of the device. An inference is made by applying this knowledge to input data. A fuzzy inference device calculates the possibility of various conclusions, and it then calculates the clearnesses of the possibilities it has produced. This device makes it possible to exploit the user's knowledge that a single phenomenon for which a single conclusion is to be drawn may have two or more distinct definitions and these may be conjoined in an OR relationship; various discrete phenomena for which a single conclusion is to be drawn may be conjoined in an OR relationship; and various discrete phenomena for which a single conclusion is to be drawn may be conjoined in an AND relationship. Thus, this device improves the accuracy of the inferences which are made, as well as broadening the area in which fuzzy inferences can be applied.

The method of the present invention is carried out by modifying input data for degree of grade with respect to membership functions. The degree of grade measure is then used to obtain the information amount of each phenomenon. A relational coefficient, which indicates the relatedness of a number of phenomena (for example, they might be linked by AND), is obtained. The degree of grade, information amount and relational coefficient are then used to determine the possibility of a conclusion. This scheme allows the user to enhance the accuracy of the information amount at the time the data are input. It also enables the user to attain an inference result with high discriminability based upon the relatedness of a number of phenomena with respect to a single conclusion.

This invention makes it possible to exploit the knowledge of an expert user concerning a single conclusion. This knowledge can include the case in which multiple discrete phenomena are conjoined in an OR relationship as well as the case in which an OR relationship and an AND relationship are both present. This allows a fuzzy inference to be made with greater reliability, which in turn broadens the range of applicability for fuzzy inference and makes it a more universal tool.

With these and other objects, advantages and features of the invention that will become hereinafter apparent, the nature of the invention will be further understood by reference to the following detailed description of the invention, the appended claims and to the drawings attached herein.

DETAILED DESCRIPTION OF THE PREFERRED EMBODIMENTS

Figure 1:
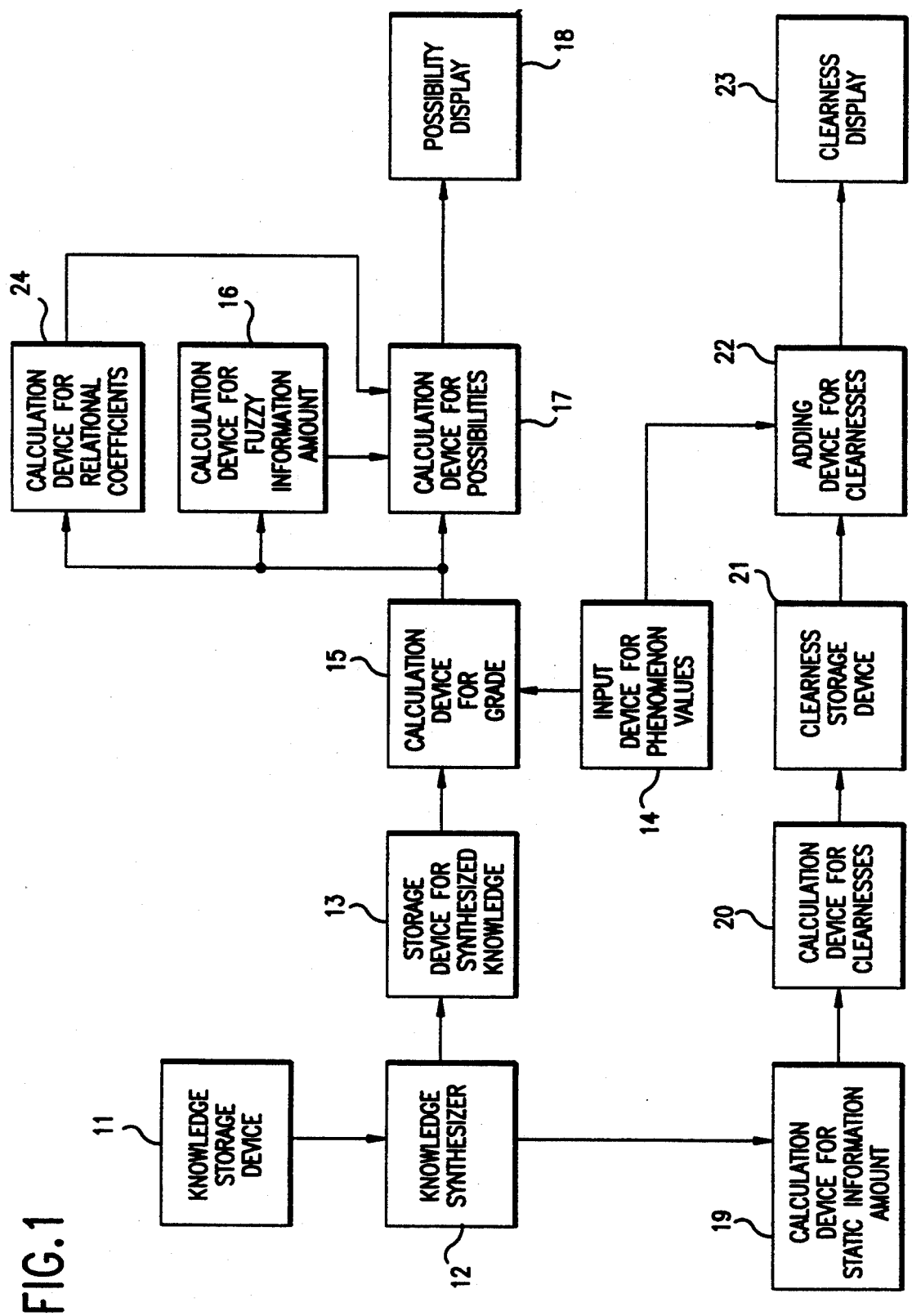
FIG. 1 is a block diagram showing the entire structure of a sample fuzzy inference device representing a first embodiment of the invention.

FIG. 1 shows the entire structure of an example of a first embodiment of the fuzzy inference device according to this invention. This device is composed of: a knowledge storage device 11; a knowledge synthesizer 12; a storage device 13 for synthesized knowledge; an input device 14 for phenomenon values; a calculation device 15 to determine the degree of grade; a calculation device 16 to determine the fuzzy information amount; a calculation device 17 to determine possibilities; a possibilities display 18; a calculation device 19 to determine static information amount; a calculation device 20 to determine clearness; a clearness storage device 21; an addition device 22 to sum clearnesses; a clearness display 23; and a calculation device 24 to determine a relational coefficient.

In particular, the knowledge storage device 11 stores knowledge input by an expert user or a similar specialist. This knowledge data is stored in a form which expresses the relationship between phenomena and a conclusion. The device is capable of storing the knowledge of more than one expert.

An example of the knowledge contributed by two experts (ex1 and ex2), which is stored in device 11, is expressed below in the form of rules:

Expert ex1:

$$\text{If } 20 \leq f1 \leq 60 \text{ and } 0 \leq f2 \leq 40 \text{ then } c1 \tag{1}$$

$$\text{If } 40 \leq f1 \leq 80 \text{ and } 60 \leq f2 \leq 100 \text{ then } c2 \tag{2}$$

Expert ex2:

$$\text{If } 30 \leq f1 \leq 50 \text{ and } 10 \leq f2 \leq 30 \text{ then } c1 \tag{3}$$

$$\text{If } 50 \leq f1 \leq 70 \text{ and } 70 \leq f2 \leq 90 \text{ then } c2 \tag{4}$$

Where: f1 and f2 are respectively, phenomenon 1 and phenomenon 2; c1 and c2 are respectively, conclusion 1 and conclusion 2. The a and b expressed in the phrase $a \leq f1 \leq b$ are respectively, minimum value and maximum value.

In rules (1) through (4) above, divers phenomena associated with a single conclusion are conjoined in an AND relationship. This AND relationship can be expressed by means of a relational coefficient, as will be discussed below.

If we express the aforesaid rules in the form of a table for each expert, they will appear as follows:

TABLE I

| | Expert ex1 | | | |
|---|---|---|---|---|
| | Conclusion | | | |
| | c1 | | c2 | |
| Phenomenon | Minimum Value | Maximum Value | Minimum Value | Maximum Value |
| f1 | 20 | 60 | 40 | 80 |
| f2 | 0 | 40 | 60 | 100 |

TABLE 2

| | Expert ex2 | | | |
|---|---|---|---|---|
| | Conclusion | | | |
| | c1 | | c2 | |
| Phenomenon | Minimum Value | Maximum Value | Minimum Value | Maximum Value |
| f1 | 30 | 50 | 50 | 70 |
| f2 | 10 | 30 | 70 | 90 |

Still referring to FIG. 1, the knowledge synthesizer 12 synthesizes the knowledge of two or more experts which was stored in storage device 11 and gives it a coherent form. An explanation regarding how knowledge is synthesized is essential for a more complete understanding of the device.

Various methods can be used to synthesize expert knowledge. In this example, the average values and standard deviations are calculated for the maximum and minimum values supplied by the various experts for each phenomenon relating to each conclusion.

The processing involved in synthesizing the knowledge, using as examples the aforesaid knowledge of two experts, leads from the phenomenon f1 to conclusion c1 as follows:

Once it is deduced, from the aforesaid rules (Formulas 1 and 3), the rule which allows conclusion 1 (c1) to be drawn from phenomenon 1 (f1), it can be expressed in the following way:

Expert ex1: If $20 \leq f1 \leq 60$ then c1 (5)

Expert ex2: If $30 \leq f1 \leq 50$ then c1 (6)

The average of the minimum values $m_{min}$ and the average of the maximum values $m_{max}$ are then calculated.

$$m_{min} = \frac{20 + 30}{2} = 25 \quad (7)$$

$$m_{max} = \frac{60 + 50}{2} = 55 \quad (8)$$

The standard deviation for the minimum values ($\sigma_{min}$) and another standard deviation for the maximum values ($\sigma_{max}$) are calculated as follows.

$$\sigma_{min} = \left( \frac{20^2 + 30^2}{2} - m_{min}^2 \right)^{\frac{1}{2}} = 5 \quad (9)$$

$$\sigma_{max} = \left( \frac{60^2 + 50^2}{2} - m_{max}^2 \right)^{\frac{1}{2}} = 5 \quad (10)$$

In this way the knowledge of the various experts pertaining to the minimum and maximum values for each phenomenon associated with each conclusion is synthesized into the aforesaid rules (formulas (1) through (4)). This synthesized knowledge is expressed in the following table.

TABLE 3

| | Conclusion | | | | | | | |
|---|---|---|---|---|---|---|---|---|
| | c1 | | | | c2 | | | |
| | Minimum Value | | Maximum Value | | Minimum Value | | Maximum Value | |
| Phenomena | Mean | Standard Deviation | Mean | Standard Deviation | Mean | Standard Deviation | Mean | Standard Deviation |
| f1 | 25 | 5 | 55 | 5 | 45 | 5 | 75 | 5 |
| f2 | 5 | 5 | 35 | 5 | 65 | 5 | 95 | 5 |

Generally speaking, membership functions are associated with each phenomenon involved in a fuzzy inference. As an example of a membership function, discussed below is a scheme which creates membership functions by means of a Gaussian distribution using the above-described expert knowledge.

Using the average of the minimum values $m_{min}$, the average of the maximum values $m_{max}$, the standard deviation of the minimum values $\sigma_{min}$ and the standard deviation of the maximum values $\sigma_{max}$, the membership function by the following formula is expressed as follows:

$$\Phi(x) = \text{Gauss}\left( \frac{x - m_{min}}{\sigma_{min}} \right) - \text{Gauss}\left( \frac{x - m_{max}}{\sigma_{max}} \right) \quad (11)$$

where:

x: Input data value associated with phenomenon $\Phi(x)$: Degree to which input data value V conforms to phenomenon (grade).

Gauss (x) Value of the Gaussian distribution of input data value x

Figure 2:
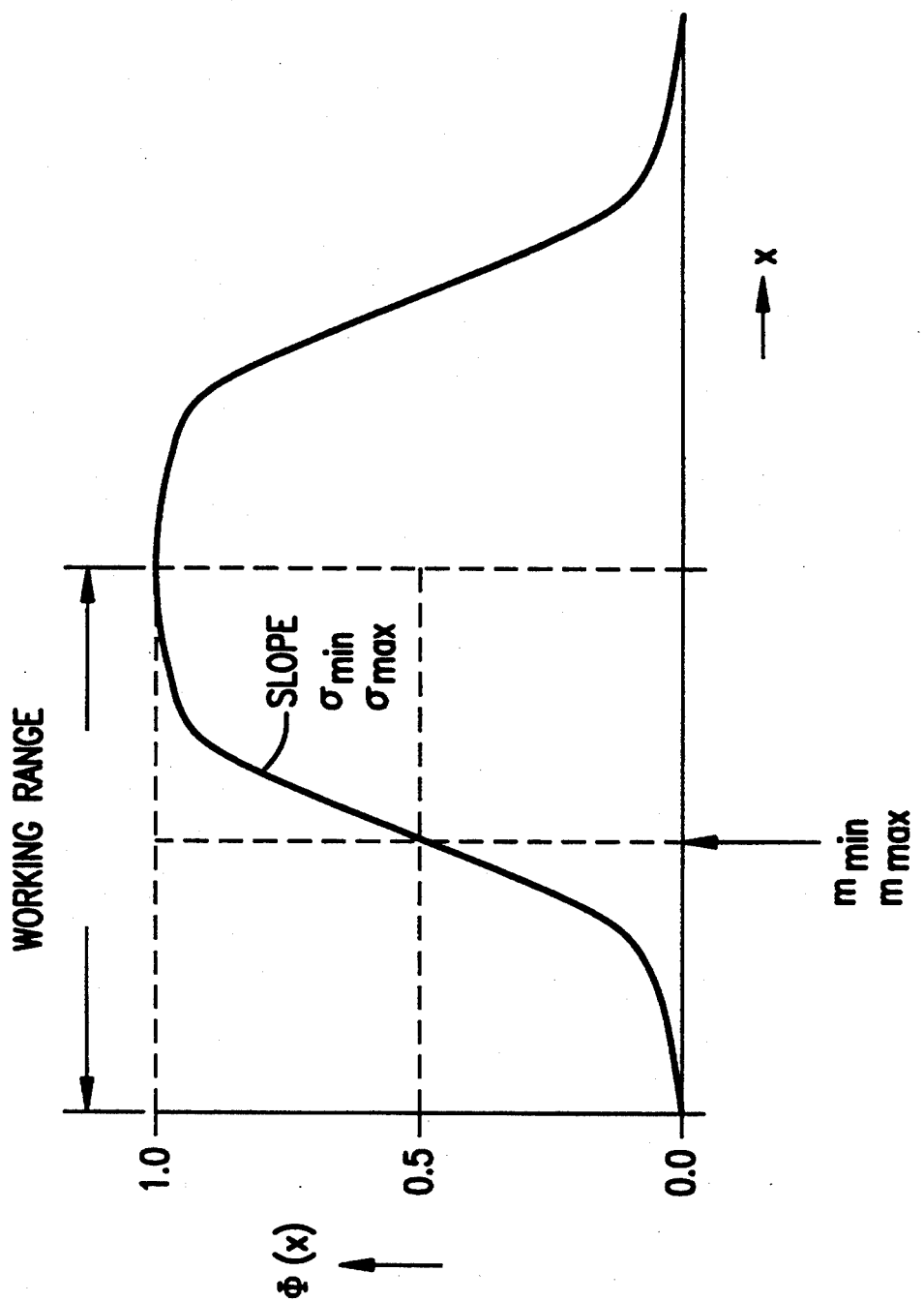
FIG. 2 is a graph illustrating a Gaussian distribution.

FIG. 2 shows an example of a Gaussian distribution. To create a membership function in this Gaussian distribution, only the left half is used. The position of x in $\Phi$, (x)=0.5 is determined by $m_{min}$ or $m_{max}$, and the slope by $\sigma_{min}$ or $\sigma_{max}$.

Figure 3A:
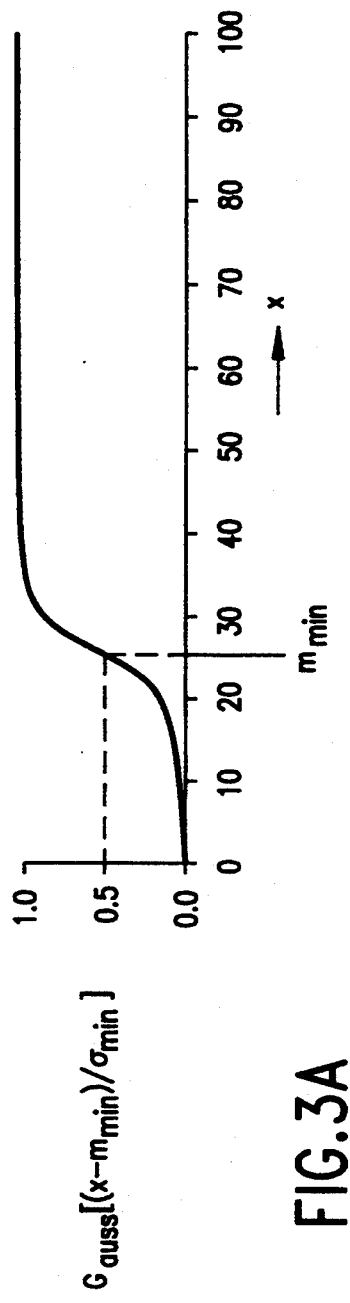
FIGS. 3A–3C graphs showing the appearance of some membership functions.
Figure 3B:
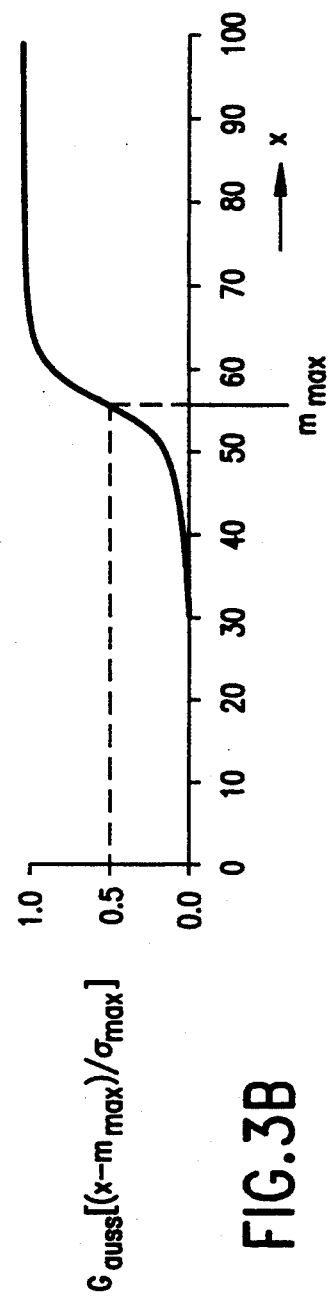
Figure 3C:
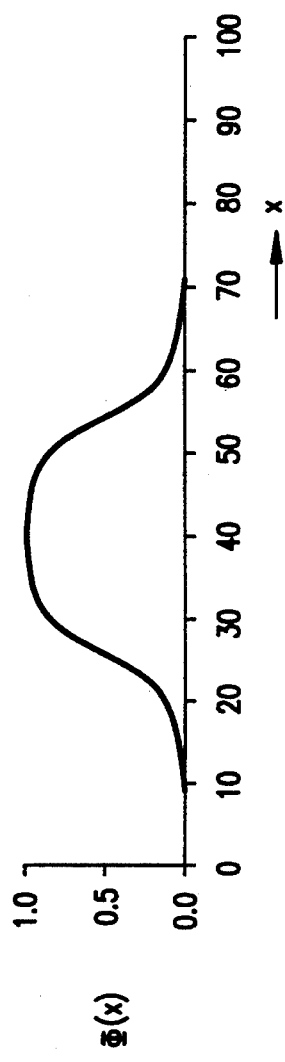

Let us use as an example the membership function used to draw conclusion c1 from phenomenon f1. Using the values which have been calculated according to formulas (7)–(10), the functions shown in FIGS. 3A through 3C are created. In this case, formula (11) is as follows.

$$\Phi(x) = \text{Gauss}\left(\frac{x-25}{5}\right) - \text{Gauss}\left(\frac{x-55}{5}\right) \quad (12)$$

FIG. 3A shows the first term on the right side of formulas (11) and (12); FIG. 3B shows the second term on the right side of formulas (11) and (12); and FIG. 3C shows the result of subtracting the second term from the first term. In other words, FIG. 3C shows the membership function expressed by formula (11) or formula (12).

Figure 4A:
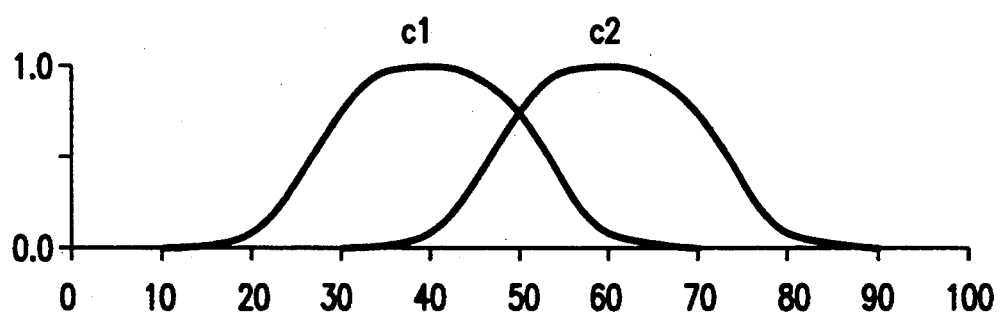
FIGS. 4A and 4B are graphs showing the membership functions obtained for each of the phenomena.
Figure 4B:
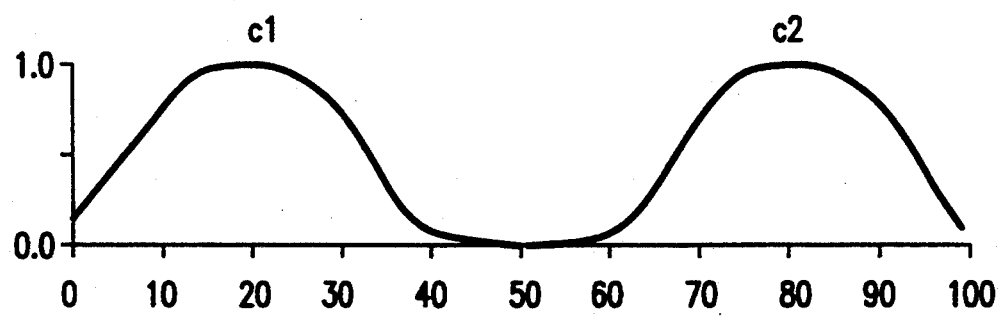

Examples of the membership functions which allow conclusions c1 and c2 to be drawn from phenomena f1 and f2 based on the synthesized knowledge shown in Table 3 are illustrated in FIGS. 4A and 4B.

Referring back to FIG. 1, the storage device is now described. The means and standard deviations which have been calculated by the knowledge synthesizer 12 are stored in a storage device 13 in the form shown in Table 3 above. As it is unnecessary to resynthesize the knowledge each time a new inference is to be made, the synthesized data can be stored in advance in this form. Further, the values stored in the device 13 can be read out and used to make each inference, thus increasing the speed at which inferences can be processed.

The phenomena value input device 14 consists primarily of a keyboard, a communications interface, a memory and files. This device reads the data input for each phenomenon. The data which have been input are transmitted to the degree of grade calculation device 15. In addition, data indicating whether or not the data for a given phenomenon have been input are sent to the clearness storage device 22.

More particularly, the calculation device 15 calculates the degree (i.e. grade) of fit with respect to each membership function (or conclusion) for the data input by input device 14. In concrete terms, grade is obtained as $\Phi$, (x) by substituting the input data value for the variable x on the right side of formula (11). Of course this formula is not the only way to calculate grade.

The operations of calculation devices 16 and 19 are now explained. Let us call the value associated with phenomenon f1 (the input data) x1, and that associated with phenomenon f2, x2. These data are input by phenomenon value input device 14.

Figure 5A:
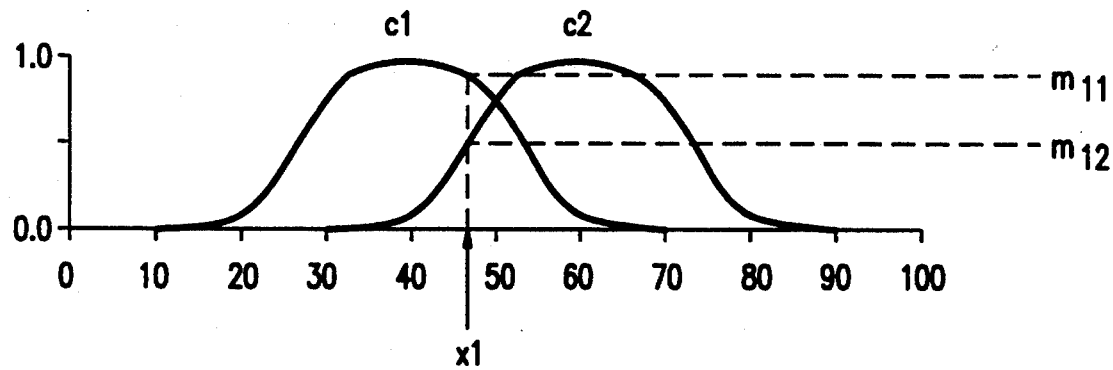
FIGS. 5A and 5B are graphs showing the grades which were obtained.
Figure 5B:
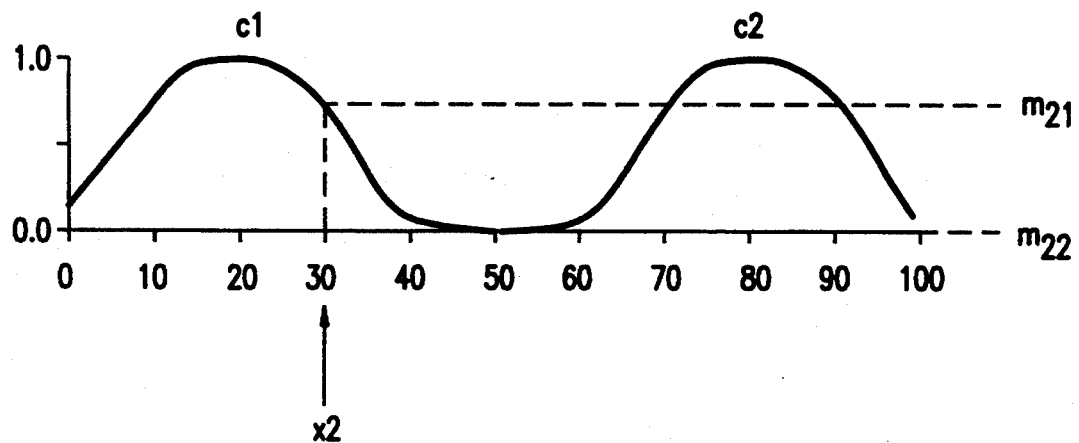

As shown in FIGS. 5A and 5B, the various grades values $m_{11}$, $m_{12}$, $m_{21}$ and $m_{22}$ are determined in the following way:

$m_{11}$: The grade of input data x1 with respect to conclusion c1
$m_{12}$: The grade of input data x1 with respect to conclusion c2
$m_{21}$: The grade of input data x2 with respect to conclusion c1
$m_{22}$: The grade of input data x2 with respect to conclusion c2

These grades are calculated by the calculation device 15 when input data x1 and x2 are received.

Now the concept known as fuzzy entropy must be considered.

The fuzzy entropy Ef1 which is obtained at the time input x1 is accepted is defined as follows:

$$Ef1 = -\frac{m_{11}}{m_{11}+m_{12}} \log\left(\frac{m_{11}}{m_{11}+m_{12}}\right) \quad (13)$$

$$-\frac{m_{12}}{m_{11}+m_{12}} \log\left(\frac{m_{12}}{m_{11}+m_{12}}\right)$$

Fuzzy entropy is a form of index measure that represents the discriminability of information. When input data x1 is accepted, the value of the fuzzy entropy will be small if a conclusion can be clearly discriminated, and large if a conclusion can only be vaguely discriminated. In other words, if the difference between $m_{11}$, the grade of input data x1 with respect to conclusion c1, and $m_{12}$, the grade of input data x1 with respect to conclusion c2, is large, the entropy value will be small. If the difference between $m_{11}$ and $m_{12}$ is small, however, the entropy value will be large.

Similarly, the fuzzy entropy Ef2 which is obtained at the time input x2 is accepted can be determined by the following formula:

$$Ef2 = -\frac{m_{21}}{m_{21}+m_{22}} \log\left(\frac{m_{21}}{m_{21}+m_{22}}\right) \quad (14)$$

$$-\frac{m_{22}}{m_{21}+m_{22}} \log\left(\frac{m_{22}}{m_{21}+m_{22}}\right).$$

The range of values which a fuzzy entropy Ef can fall into is shown below.

$0 \leq Ef \leq \log(n)$ n: number of conclusions for each phenomenon.

In the previously described example, phenomenon 1 (f1) has two conclusions (c1 and c2), so the maximum value of its fuzzy entropy is log (2).

The fuzzy entropy Ef1 is used to obtain the fuzzy information amount $If1_D(x1)$ at the time input data x1 is accepted. The value $If1_D(x1)$, which is called the fuzzy information amount, is the discriminatory power the phenomenon possesses with regard to deciding on a single conclusion when making an inference. This value will be large when the difference between grade $m_{11}$ of input data x1 with respect to conclusion c2 is large, and it will be small when the difference between the two grades is small.

The fuzzy information amount $If1_D(x1)$ of phenomenon f1 is defined as the value achieved by subtracting fuzzy entropy Ef1 at the time input data is accepted from the maximum fuzzy entropy.

$$IF1_D(x1) = \log(2) + \left\{\frac{m_{11}}{m_{11}+m_{12}} \log\left(\frac{m_{11}}{m_{11}+m_{12}}\right) + \right. \quad (15)$$

$$\left. \frac{m_{12}}{m_{11}+m_{12}} \log\left(\frac{m_{12}}{m_{11}+m_{12}}\right)\right\}$$

Correspondingly, the fuzzy information amount of phenomenon f2 at the time input data x2 is accepted is defined as follows:

$$If2_D(x2) = \log(2) + \left\{\frac{m_{21}}{m_{21}+m_{22}} \log\left(\frac{m_{21}}{m_{21}+m_{22}}\right) + \right. \quad (16)$$

-continued $$\frac{m_{22}}{m_{21}+m_{22}} \log\left(\frac{m_{22}}{m_{21}+m_{22}}\right)\right\}$$

The calculation device 16 determines the fuzzy information amount of each phenomenon according to formulas (15) and (16), using the grades obtained by calculation device 15.

As is demonstrated above, the fuzzy information amount is dependent upon input data x1 and x2.

In contrast to this, the static information amount, which is calculated by the static information calculation device 19, is independent of input data. The average of the fuzzy entropies in the mid-range of the phenomenon is subtracted from the maximum fuzzy entropy, and the resulting value is considered the static information amount of the phenomenon as a whole.

As an example, the static information amount of phenomenon 1 is obtained by the following formula:

$$IF1_S = \log(2) + \qquad (17)$$

$$\left[\sum_{x=1}^{100}\left(\frac{m_{11}(x)}{m_{11}(x)+m_{12}(x)} \log\left(\frac{m_{11}(x)}{m_{11}(x)+m_{12}(x)}\right)+ \frac{m_{12}(x)}{m_{11}(x)+m_{12}(x)} \log\left(\frac{m_{12}(x)}{m_{11}(x)+m_{12}(x)}\right)\right)\right]/100$$

Similarly, the static information amount of phenomenon 2 is obtained by the following formula.

$$IF2_S = \log(2) + \qquad (18)$$

$$\left[\sum_{x=1}^{100}\left(\frac{m_{21}(x)}{m_{21}(x)+m_{22}(x)} \log\left(\frac{m_{21}(x)}{m_{21}(x)+m_{22}(x)}\right)+ \frac{m_{22}(x)}{m_{21}(x)+m_{22}(x)} \log\left(\frac{m_{22}(x)}{m_{21}(x)+m_{22}(x)}\right)\right)\right]/100$$

where:
$m_{11}(x)$: The grade with respect to conclusion c1 of input data x associated with phenomenon f1.
$m_{12}(x)$: The grade with respect to conclusion c2 of input data x associated with phenomenon f1.
$m_{21}(x)$: The grade with respect to conclusion c1 of input data x associated with phenomenon f2.
$m_{22}(x)$: The grade with respect to conclusion c2 of input data x associated with phenomenon f2.
[Σ . . . ]/100: Calculation to determine the average of the fuzzy entropies obtained for all x when x is varied at interval in the phenomenon range between 0 and 100. ($0 < \delta \leq 100$)

As can be deduced from formulas (17) and (18), the static information amount of a phenomenon is small when the overlap between the membership functions for the phenomenon is large, and large when the overlap is small. In other words, the static information amount indicates the capacity of a membership function for a phenomenon to discriminate a conclusion.

Calculation device 19 calculates the static information amount of each phenomenon according to the aforementioned formulas (17) and (18), using the membership functions obtained by means of the synthesized knowledge. Because the static information amount is not dependent on input data, it need only be calculated once.

The operations of calculation device 24 of FIG. 1 will now be explained. The calculation device 24 determines the relational coefficient of each conclusion using the grade measure calculated by calculation device 15. The relational coefficient of a conclusion indicates the relatedness (the aforesaid linkage by AND) of the phenomena associated with that conclusion. It can be obtained in the following way:

Relational coefficient k1 of conclusion c1
= the minimum grade of the phenomena associated with conclusion c1
= MIN ($m_{11}$ and $m_{21}$)  (19)

Relational coefficient k2 of conclusion c2
= the minimum grade of the phenomena associated with conclusion c2
= MIN ($m_{12}$ and $m_{22}$)

Here the term MIN ( ) refers to the calculation of selecting the smallest of the values which have been accepted.

The operations of possibility calculation means 17 are now described. There are a number of different schemes which can be used to calculate possibilities. In this section, three schemes are discussed.

Scheme 1

For each conclusion, the sum of the information amounts of phenomena associated with the conclusion will be 1. Information amount is calculated in such a way that the relative strengths of these information amounts do not vary. The information amounts which are obtained are known as weights.

As an example of the aforementioned fuzzy information amount, the weights are as follows:

Weight of phenomenon 1 with respect to conclusion 1:

$$wf_{11} = If1_D(x1)/[If1_D(x1)+If2_D(x2)] \qquad (21)$$

$$wf_{12} = If2_D(x2)/[If1_D(x1)+If2_D(x2)] \qquad (22)$$

Weight of phenomenon 1 with respect to conclusion 2:

$$wf_{21} = If1_D(x1)/[If1_D(x1)+If2_D(x2)] \qquad (23)$$

Weight of phenomenon 2 with respect to conclusion 2:

$$Wf_{22} = If2_D(x2)/[If1_D(x1)+If2_D(x2)] \qquad (24)$$

Next, the products of these weights and the grades are calculated. These are totaled for each conclusion, and the totals are multiplied by the relational coefficients of those conclusions. The values obtained are the possibilities of those conclusions.

In the example given above,

The possibility of conclusion
$1 = (wf_{11} \times m_{11} + wf_{12} \times m_{21}) \times k1$  (25)

The possibility of conclusion
$2 = (wf_{21} \times m_{12} + wf_{22} \times m_{22}) \times k2$  (26)

Calculation device 17 calculates the possibility of each conclusion by performing the operations described above.

Scheme 2

The fuzzy information amount is normalized in such a way that the value which expresses this amount for each phenomenon is in the range between 0 and 1. The mean is calculated for the normalized fuzzy information amounts of the phenomena related to each conclusion. This value is called weight.

To normalize the fuzzy information amount of each phenomenon, the value of this amount is divided by log (2), the maximum fuzzy entropy. That is, The normalized fuzzy information amount of phenomenon f1

$$If1_{D'} = If1_D(x1)/\log(2) \qquad (27)$$

The normalized fuzzy information amount of phenomenon f2

$$If2_{D'} = If2_D(x2)/\log(2) \qquad (28)$$

The aforesaid normalized fuzzy information amount can be used as follows to express the weight of each conclusion.

Since both phenomena f1 and f2 are used to draw conclusion 1, the average of their normalized information amounts is calculated:

$$\text{Weight of conclusion 1: } w1 = (If1_{D'} + If2_{D'})/2 \qquad (29)$$

Both phenomena are also used to draw conclusion 2, so its weight will be expressed in the same way:

$$\text{Weight of conclusion 2: } w2 = (If1_{D'} + If2_{D'})/2 \qquad (30)$$

The denominator in formulas (29) and (30), in case 2, expresses the number of phenomena associated with each conclusion.

The possibility of a conclusion is expressed as the product of the aforesaid weight of the conclusion and the relational coefficient.

$$\text{Possibility of conclusion 1} = w1 \times k1 \qquad (31)$$

$$\text{Possibility of conclusion 2} = w2 \times k2 \qquad (32)$$

The possibility calculation device 17 of FIG. 1 determines the possibility of each conclusion by performing the above calculations.

Scheme 3

The average of the weights of phenomena showed by formulas (21)–(24) vis-a-vis a conclusion is calculated for each conclusion and the result is multiplied by the relational coefficient related to the conclusion. This yields the possibility of the conclusion.

$$\text{Possibility of conclusion 1} = [(wf_{11} + wf_{12})/2] \times k1 \qquad (33)$$

$$\text{Possibility of conclusion 2} = [(wf_{21} + wf_{22})/2] \times k2 \qquad (34)$$

The possibility calculation device 17 determines the possibility of each conclusion by performing the above calculations.

Possibility display 18 of FIG. 1 displays the possibility which has been calculated for each conclusion by the possibility calculation device 17. The display can be arranged so that it displays the possibilities for all the conclusions simultaneously, or in such a way that it displays the highest possibilities one or several at a time. Possibilities can be sent via a communications device to other equipment, and they can be stored in a memory or file.

The operations of calculation device 20 are now explained. The calculation device 20 calculates the clearness of each phenomenon with respect to each conclusion. The clearness of a phenomenon with respect to a conclusion refers to a value which indicates the relative discriminability of each phenomenon at the time when the possibility of a certain conclusion is assessed. Thus, clearness allows us to compare the discriminability of several phenomena in order to settle on a certain conclusion. Clearness tells us which phenomenon has high discriminability (high information amount). The method which is used to calculate clearness is described below.

The relationship between a conclusion and a phenomenon with its static information amount is shown in Table 4.

TABLE 4

| Phenomenon | Conclusion | |
|---|---|---|
| | c1 | c2 |
| f1 | $If1_S$ | $If1_S$ |
| f2 | $If2_S$ | $If2_S$ |
| TOTAL | $If1_S + If2_S$ | $If1_S + If2_S$ |

As can be understood from Table 4, the fuzzy information amount allows us to compare the discriminability of several phenomena in order to settle on a particular conclusion. However, in its raw form, relative discriminability is difficult to grasp intuitively; for this reason, the fuzzy information amount is normalized for each conclusion, as shown in Table 5 below. The normalized value which results for each phenomenon with respect to each conclusion is called its clearness, which is abbreviated as Cl.

TABLE 5

| Phenomenon | Conclusion | |
|---|---|---|
| | c1 | c2 |
| f1 | $Cl_{11}$ | $Cl_{12}$ |
| f2 | $Cl_{21}$ | $Cl_{22}$ |
| TOTAL | 1 | 1 |

Here $Cl_{11} = Cl_{12} = If1_s/(If1_s + If2_s)$ and $Cl_{21} = Cl_{22} = If2_s/(If1_s + If2_s)$ In this way calculation device 20 calculates the clearness of each phenomenon with respect to each conclusion.

The storage device 21 of FIG. 1 stores the clearness of each phenomenon which has been calculated by the calculation device 20 for each conclusion. Clearness needs to be calculated each time an inference is made. The clearnesses which have been calculated can be stored in storage device 21 when the expert knowledge is synthesized, and the stored values can be read out each time an inference is to be made. This speeds up inference processing.

The clearness addition device 22 device calculates the clearness of phenomena for which data have actually been input. To actually make an inference, the clearnesses of phenomena for which data have been input must be totaled. The total of these clearnesses gives the clearness of the result of the inference. If this clearness is high, then there is a large information amount which can be used to drawn an inference. Thus, the clearness can be used as an index with which to judge the reliability of the inference itself.

Clearness with respect to the result of an inference is calculated in the following ways:

a) When data have been input for phenomenon 1 (f1) only:

The clearness $Cl_1$ with respect to the inference of conclusion 1 (c1) = $Cl_{11}$.

The clearness $Cl_2$ with respect to the inference of conclusion 2 (c2) = $Cl_{12}$.

b) When data have been input for phenomenon 2 (f2) only:

The clearness $Cl_1$ with respect to the inference of conclusion 1 (cl) = $Cl_{21}$.

The clearness $Cl_2$ with respect to the inference of conclusion 2 (c2) = $Cl_{22}$.

c) When data have been input for both phenomenon 1 (f1) and phenomenon 2 (f2):

The clearness $Cl_1$ with respect to the inference of conclusion 1 (cl) = $Cl_{11} + Cl_{21} = 1.0$.

The clearness $Cl_2$ with respect to the inference of conclusion 2 (c2) = $Cl_{12} + Cl_{22} = 1.0$.

The clearness Cl of an inference must be in the range of $0.0 \leq Cl \leq 1.0$.

That is to say, when data are input for all the phenomena which, according to the knowledge stored prior to the inference, can be used to draw a conclusion, and an inference is made, the clearness of that conclusion will be 1.0. If data are input for only some of the phenomena which can be used to draw a conclusion, the clearness will be a value between 0.0 and 1.0. If, from among the usable phenomena, many phenomena with high clearness are used, then the clearness of the conclusion will be high. Here we can say that the inference made will be highly reliable.

The clearness display 23 displays the clearness of an inference result (for example, the above-mentioned possibility) after the clearnesses have been totaled by addition device 22. Clearness can be displayed along with the result of the inference or it can be sent to another device and stored in a memory or file.

The clearness display presents the clearness for every conclusion resulting from the inference. Thus when there is more than one conclusion, the clearness assigned to each conclusion will be displayed.

With this scheme, the information amount of a phenomenon will be calculated each time data are input for that phenomenon. When the clearness of an inference is displayed, the user will be able to judge the reliability of the inference.

Each of the aforesaid devices 11 through 24 can be realized by means of a computer with a memory and a display. Specifically, a knowledge synthesizer 12 and calculation devices 15, 16, 17,19, 20 and 22 would be ideally realized by a CPU operating in accordance with one or several programs.

Figure 6:
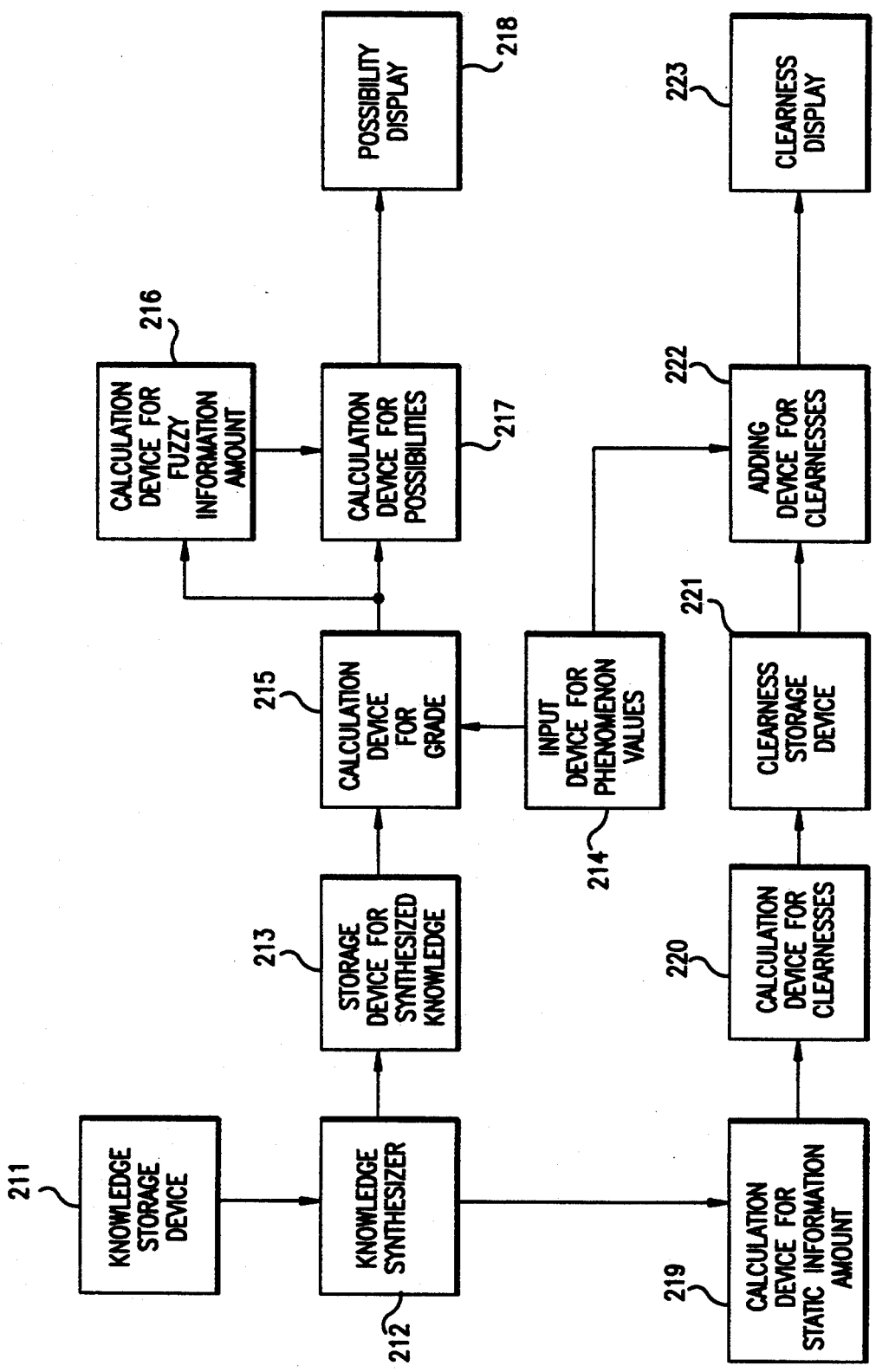
FIG. 6 is a block diagram showing the entire structure of a second embodiment of a sample fuzzy inference device.

The second embodiment of the invention is now described with regard to FIG. 6. The second embodiment is used in the case in which the knowledge of an expert user concerning the relationship between phenomena and a conclusion (a rule) expresses the fact that a single phenomenon relating to a single conclusion has two or more separate and distinct definitions which are con-joined by an OR. This type of phenomenon can be expressed as a double-humped (having two peaks) or multi-humped (having three or more peaks) membership function concerned with a single conclusion.

As an example of a single phenomenon relating to a single conclusion having two separate and distinct definitions, the case of a breakdown occurring when the speed of rotation of a motor is either extremely slow or extremely fast is illustrative. As an example of a single phenomenon relating to a single conclusion having three or more separate and distinct definitions, let us use the case of a breakdown occurring when vibration occurs which has a frequency that is an integer multiple of a given frequency f. In this case, if the frequency is graphed on the horizontal axis, then the peaks corresponding to mutually independent membership functions will be found at positions corresponding to frequencies mf (m = 1, 2, 3, and so on).

The second embodiment of the fuzzy inference device is shown in FIG. 6. Since many features are similar to that of FIG. 1, their details are not repeated.

Similar to the storage device 11, the knowledge storage device 211 stores knowledge input by an expert user or a similar specialist. This knowledge is stored in a form which expresses the relationship between phenomena and a conclusion. The device can store the knowledge of more than one expert.

An example of knowledge contributed by two experts, who shall be called ex1 and ex2, and stored in device 211, is expressed below in the form of rules:

Expert ex1:

If $0 \leq f1 \leq 30$ or $70 \leq f1 \leq 100$ and $0 \leq f2 \leq 40$ then c1 (35)

If $40 \leq f1 \leq 80$ then $60 \leq f2 \leq 100$, then c2 (36)

Expert ex2:

If $10 \leq f1 \leq 20$ or $80 \leq f1 \leq 90$ and $10 \leq f2 \leq 30$, then c1 (37)

If $50 \leq f1 \leq 70$ and $70 \leq f2 \leq 90$, then c2 (38)

f1 and f2 are phenomena which are respectively, phenomenon 1 and phenomenon 2. c1 and c2 are conclusions which are called, respectively, conclusion 1 and conclusion 2. a and b are expressed by the phrase $a \leq f1 \leq b$ and are called, respectively, the minimum value and the maximum value.

In formulas (35) and (37) given above, phenomenon f1 relating to conclusion c1 is defined as having two mutually independent ranges. Accordingly, the membership function for phenomenon f1 relating to conclusion c1 will have two peaks.

The user knowledge is stored in knowledge storage device 211 as phenomenon data and conclusion data with the data structure described in Tables 6 and 7 below. Both concern the knowledge of Expert ex1 which was expressed in formulas (35) and (36).

TABLE 6

| (Phenomenon Data) | | | | | | |
|---|---|---|---|---|---|---|
| | f1(0) | | f1(1) | | f1(2) | ... |
| | Min. Value | Max. Value | Min. Value | Max. Value | Min. Value | Max. Value |
| f1 | 0 | 30 | 70 | 100 | 40 | 80 | ... |
| | f2(0) | | f2(1) | | | ... |

TABLE 6-continued (Phenomenon Data)

| | Min. Value | Max. Value | Min. Value | Max. Value | ... |
|---|---|---|---|---|---|
| f2 | 0 | 40 | 60 | 100 | ... |

In Table 6, f1(0), f1(1), f1(2) and so on express the various definitions for phenomenon f1.

Correspondingly, f2(0), f2(1) and so on represent the definitions associated with phenomenon f2.

TABLE 7

(Conclusion Data)

| c1 | f1(0) | f1(1) | f2(0) | ... |
|---|---|---|---|---|
| c2 | f1(2) | f2(1) | | ... |

Table 7 contains data relevant to the phenomena associated with each conclusion. Definitions of the same phenomenon which are adjacent to each other (for example, f1(0) and f1(1)) are connected by OR. Of course one may also enter a code which has the effect of linking the definitions with OR.

Various ways can be thought of to store the expert knowledge which are different from Tables 6 and 7 above. Whatever scheme is used, the data should be stored in a form which reflects the fact that there are multiple definitions for each phenomenon and also reflects the relatedness of multiple phenomena (including identical phenomena) with respect to each conclusion.

The knowledge synthesizer 212 synthesizes the knowledge of two or more experts which was stored in storage device 211 and gives it a coherent form.

Once we educe, from the aforesaid rules (Formulas 1 and 2), the rule which allows us to draw conclusion c1 from phenomenon f1, can be expressed in the following way:

Expert ex1:

If $0 \leq f1 \leq 30$ or $70 \leq f1 \leq 100$, then c1 (39)

Expert ex2:

If $10 \leq f1 \leq 20$ or $80 \leq f1 \leq 90$, then c1 (40)

When these rules are expressed using the codes f1(0) and f1(1) to indicate the two definitions of the aforesaid phenomenon f1, the rule can be expressed as follows.

Expert ex1:

If f1(0) or f1(1), then c1 (41a)

Expert ex2:

If f1(0) or f1(1), then c1 (41b)

The average values $m_{min}$ and $m_{max}$ are calculated for the minimum and maximum values given by ex1 and ex2 for definition f1(0).

$$m_{min} = \frac{0 + 10}{2} = 5 \quad (42)$$

$$m_{max} = \frac{30 + 20}{2} = 25 \quad (43)$$

The standard deviation is then calculated for the minimum value ($\sigma_{min}$) and the maximum value ($\sigma_{max}$).

$$\sigma_{min} = \left( \frac{0^2 + 10^2}{2} - m_{min}^2 \right)^{\frac{1}{2}} = 5 \quad (44)$$

$$\sigma_{max} = \left( \frac{30^2 + 20^2}{2} - m_{max}^2 \right)^{\frac{1}{2}} = 5 \quad (45)$$

In the same way, the average minimum and maximum values $m_{min}$ and $m_{max}$ are calculated for the minimum and maximum values given by ex1 and ex2 for definition f1(1).

$$m_{min} = \frac{70 + 80}{2} = 75 \quad (46)$$

$$m_{max} = \frac{100 + 90}{2} = 95 \quad (47)$$

And in the same way, the standard deviations $\sigma_{min}$ and $\sigma_{max}$ are calculated for the minimum and maximum values.

$$\sigma_{min} = \left( \frac{70^2 + 80^2}{2} - m_{min}^2 \right)^{\frac{1}{2}} = 5 \quad (48)$$

$$\sigma_{max} = \left( \frac{100^2 + 90^2}{2} - m_{max}^2 \right)^{\frac{1}{2}} = 5 \quad (49)$$

In this way, the knowledge of the various experts pertaining to each definition for each phenomenon is synthesized, and the following synthesized data are obtained.

TABLE 8

(Synthesized Phenomenon Data)

| | f1(0) | | | | | f1(1) | | | | | f1(2) | | | | | ... |
|---|---|---|---|---|---|---|---|---|---|---|---|---|---|---|---|---|
| | Minimum Values | | Maximum Values | | | Minimum Values | | Maximum Values | | | Minimum Values | | Maximum Values | | | |
| | Mean | Stan. Dev. | Mean | Stan. Dev. | No. of Experts | Mean | Stan. Dev. | Mean | Stan. Dev. | No. of Experts | Mean | Stan. Dev. | Mean | Stan. Dev. | No. of Experts | |
| f1 | 5 | 5 | 25 | 5 | 2 | 75 | 5 | 95 | 5 | 2 | 45 | 5 | 75 | 5 | 2 | ... |

TABLE 9

| (Synthesized Phenomenon Data) | | | | | | | | | |
|---|---|---|---|---|---|---|---|---|---|
| | f2(0) | | | | | f2(1) | | | ... |
| | Minimum Values | | Maximum Values | | | Minimum Values | | Maximum Values | |
| | Mean | Standard Deviation | Mean | Stan. Dev. | No. of Experts | Mean | Stan. Dev. | Mean | Stan. Dev. | No. of Experts | ... |
| f2 | 5 | 5 | 35 | 5 | 2 | 65 | 5 | 95 | 5 | 2 | ... |

TABLE 10

| (Synthesized Conclusion Data) | | | | |
|---|---|---|---|---|
| c1 | f1(0) | f1(1) | f2(0) | ... |
| c2 | f1(2) | f2(1) | | ... |

The synthesized data for a conclusion are the same as those given in Table 7. Table 10 shows them again for your convenience.

As previously described in FIG. 2, using the average of the minimum values $m_{min}$, the average of the maximum values $m_{max}$, the standard deviation of the minimum values $O_{min}$ and the standard deviation of the maximum values $O_{max}$, can be determined which is identical to formula (11) of the first embodiment.

Figure 7A:
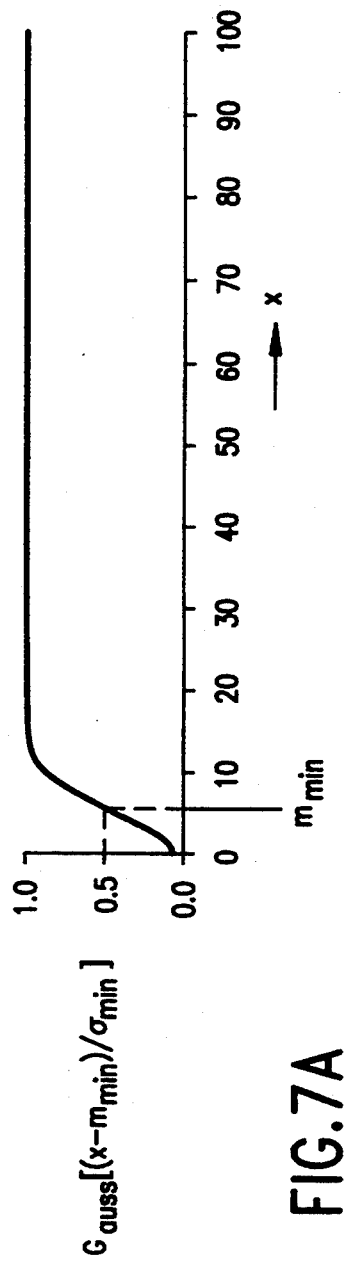
FIGS. 7A–7C are graphs showing the appearance of some membership functions of the second embodiment.
Figure 7B:
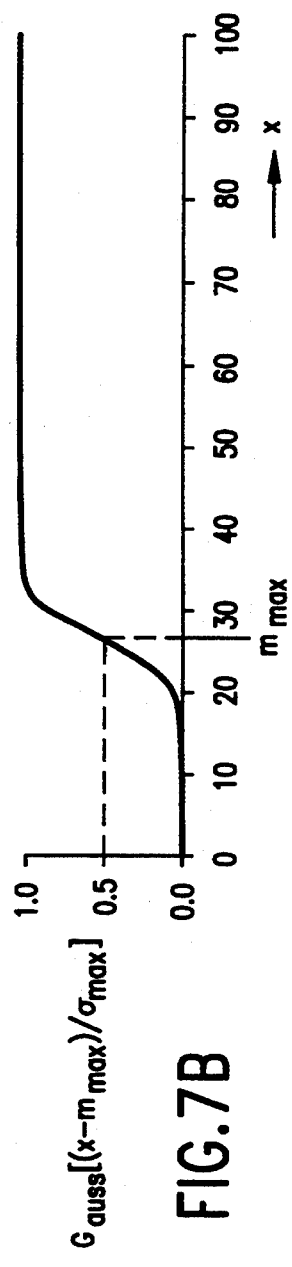
Figure 7C:
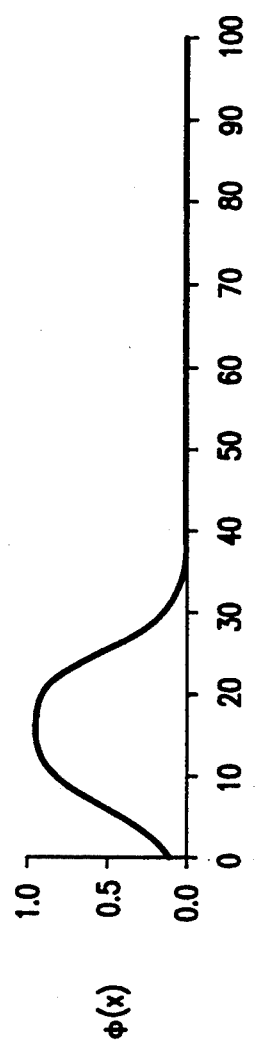

As an example, the membership function for definition f1(0) of phenomenon f1 relating to conclusion c1 are described. Using the values which have been calculated according to formulas (42)–(45), the functions shown in FIGS. 7A–7C are created. In this case, formula (50) reads as follows:

$$\Phi(x) = \text{Gauss}\left(\frac{x-5}{5}\right) - \text{Gauss}\left(\frac{x-25}{5}\right) \quad (50)$$

FIG. 7A shows the first term on the right side of formulas (11) and (12); FIG. 7B shows the second term on the right side of formulas (11) and (50); and FIG. 7C shows the result of subtracting the second term from the first term. In other words, FIG. 7C shows the membership function expressed by formula (11) or formula (50).

Examples of the membership functions obtained by using the synthesized phenomenon data shown in Tables 8 and 9 are illustrated in. FIGS. 8A–8D.

Data pertaining to phenomena or conclusions which have been synthesized by knowledge synthesizer 212 are stored in storage device 213 in form shown in Tables 8–10.

Phenomena value input device 214 is similar to device 14 of FIG. 1. However, data for phenomena need not be limited to definite values, but can also be sent in the form of linguistic data or membership functions.

Calculation device 215 is similar to device 15 of FIG. 1. In this embodiment, if the input data are in the form of linguistic values or membership functions, the grade can be obtained by performing a MIN-MAX calculation.

For example, consider a phenomenon f1 relating to conclusion c1. This phenomenon has two (or more) definitions conjoined by OR. In this case, the result of the MAX calculation used to determine grade to the membership function for each definition is also the grade of the phenomenon. For example, with reference to FIG. 8A, it is worthwhile to define the grade of phenomenon data x1 concerning phenomenon f1 with respect to definition f1(0) $m_{f1(0)}$, and the grade with respect to definition f1(1) $m_{f1(1)}$. The grade $m_{11}$ of phenomenon data x1 can be determined by the following formula:

$$m_{11} = \text{MAX}(m_{f1(0)}, m_{f1(1)}) \quad (51)$$

Figure 8A:
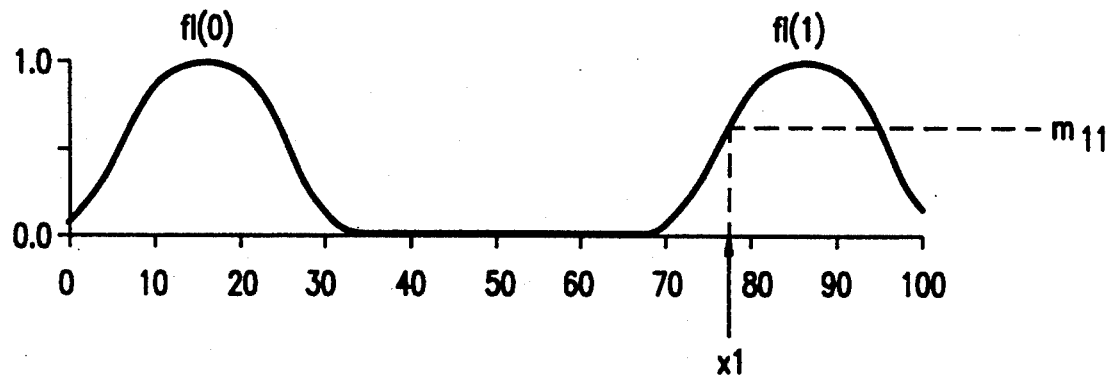
FIGS. 8A–8D are graphs showing the membership functions obtained for each of the phenomena and the grade of each phenomena to the function of the second embodiment.
Figure 8B:
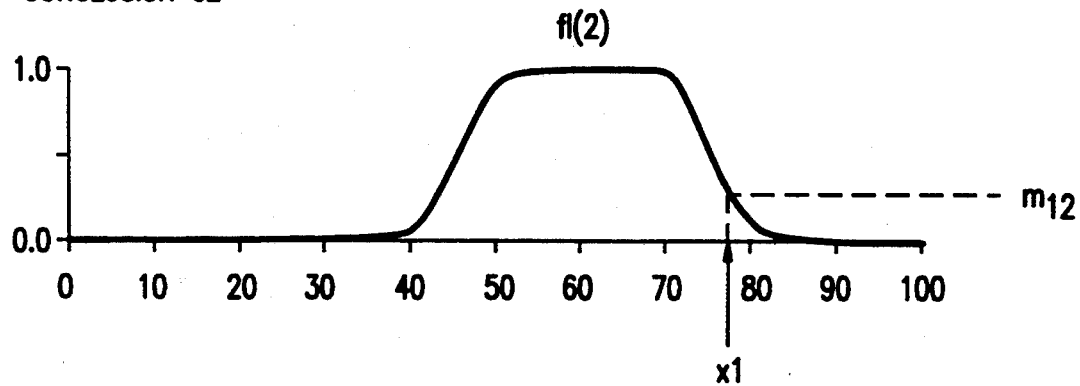
Figure 8C:
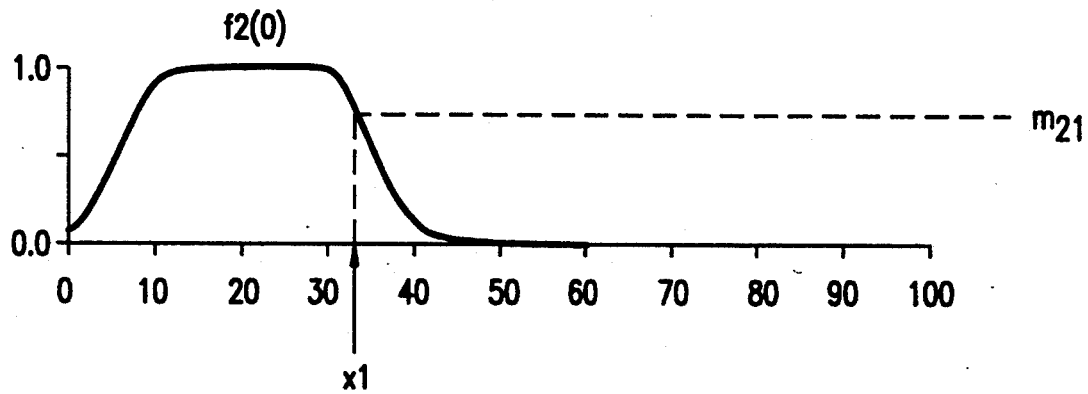
Figure 8D:
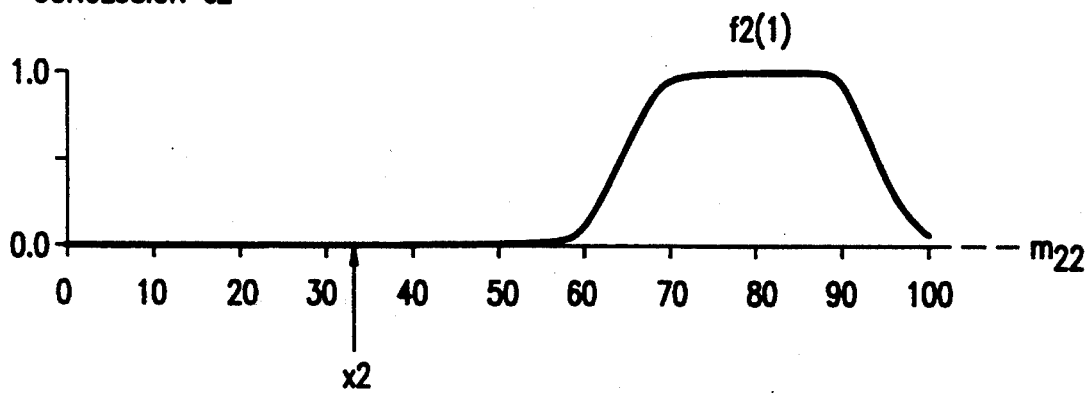

In the example shown in FIG. 8A, $m_{f1(0)}=0$ and $m_{f1(1)}=m_{11}$. The larger of the two is selected by the MAX calculation in formula (51).

It is assumed in the above explanation that the membership function related to definition f1(0) and that related to definition f1(1) are two separate functions. However, if it is assumed that FIG. 8A is dealing with the single synthesized membership function, which has two peaks and ranges from 0 to 100, the grade $m_{11}$ of input data x1 with respect to the synthesized membership function can be determined in the same way. This grade $m_{11}$ is also the grade of input data x1 with respect to conclusion c1 (i.e., the grade with respect to the membership function of phenomenon f1 for conclusion c1). As such, it is used in calculating the fuzzy information amount and the possibility of a given conclusion, as shown below.

Details regarding the calculation devices 216, 217 are similar to devices 16 and 19 of FIG. 1, except as shown in FIGS. 8A–8D. The fits $m_{11}$, $m_{12}$, $m_{21}$ and $m_{22}$ are determined as follows:

$m_{11}$: The grade of input data x1 with respect to conclusion c1 (the grade with respect to the membership functions for definitions f1(0) and f1(1) of phenomenon f1 pertaining to conclusion c1; the result of the aforementioned MAX calculation).

$m_{12}$: The grade of input data x1 with respect to conclusion c2 (the grade with respect to the membership function for definitions f1(2) of phenomenon f1 pertaining to conclusion c2).

$m_{21}$: The grade of input data x2 with respect to conclusion c1 (the grade with respect to the membership function for definition f2(0) of phenomenon f2 pertaining to conclusion c1).

$m_{22}$: The grade of input data x2 with respect to conclusion c2 (the grade with respect to the membership function for definition f2(1) of phenomenon f2 pertaining to conclusion c2).

The fuzzy entropy Ef1 is obtained using previously described formula (13). Similarly, the fuzzy entropy Ef2 is shown in above-described formula (14). The fuzzy information amount values If1$_D$(x1) and If2$_D$(x2) are respectively shown in previously described formulas (15) and (16). Finally, the static information amount of phenomena 1 and 2 are obtained by the previously described formulas (24) and (25) respectively.

We can express the aforesaid fuzzy entropy, static information amount and fuzzy information amount in the form of general formulas:

Let grade $m_{ij}$ be the grade of input data (phenomenon value) xi with respect to the membership function for conclusion cj. Here i refers to the phenomenon and has a value between 1 and m; j refers to the conclusion and has a value between 1 and n.

Fuzzy entropy Efi which is obtained at the time input xi is accepted can be defined as follows.

$$Efi = - \sum_{j=1}^{n} \{(m_{ij}/M_i)\log(m_{ij}/M_i)\} \qquad (52)$$

where $$M_i = \sum_{j=1}^{n} m_{ij} \qquad (53)$$

The fuzzy information amount $Ifi_D(xi)$ of phenomenon fi is defined as the value resulting, when the fuzzy entropy Efi which is obtained when input data xi are accepted, is subtracted from the maximum fuzzy entropy.

$$Ifi_D(xi) = \log(n) + \sum_{j=1}^{n} \{(m_{ij}/M_i)\log(m_{ij}/M_i)\} \qquad (54)$$

The fuzzy information amount of phenomenon fi for which input data xi have not been accepted will be zero.

The static information amount of phenomenon i is obtained by the following formula.

$$Ifi_S = \log(m) + \qquad (55)$$

$$(1/p)\left[\sum_{k=1}^{p}\left(\sum_{j=1}^{n}(m_{ij}(xi_k)/m_i(xi_k)) \times \log(m_{ij}(xi_k)/M_i(xi_k))\right)\right]$$

where $$M_i(xi_k) = \sum_{j=1}^{n} m_{ij}(xi_k) \qquad (56)$$

$m_{ij}(xi_k)$: The grade of input data $xi_k$ associated with phenomenon fi with respect to the membership function for conclusion cj.

When the static information amount is obtained, the range of phenomenon f1 between $xi_1$ and $xi_p$ (corresponding to 0 to 100 in FIG. 8A) is divided into (p−1) segments at intervals of δ. The term (1/p) [Σ ... ] gives the fuzzy entropy for each $xi_k$ and expresses the calculation of obtaining their average.

Details regarding the possibility calculation device 217 are now provided and are generally similar to previously described scheme 1 of device 17. Only those aspects of device 217 which differ from 17 are described.

Calculation device 217 calculates the possibility of each conclusion by performing the operations on the weights of Scheme 1 described previously.

The weight wi of each phenomenon fi is expressed as follows:

$$wi = Ifi_D(xi)/\sum_{i=1}^{m} Ifi_D(xi) \qquad (57)$$

The possibility $Pr_j$ of each conclusion cj is expressed as follows:

$$Pr_j = \sum_{i=1}^{m} (wi \times m_{ij}) \qquad (58)$$

Possibility display 218 displays the possibility as previously described with reference to display 18 of FIG. 1, and the calculation device 220 calculates the clearness of each phenomenon similarly to device 20 of FIG. 12. Note that the relationship between a conclusion and a phenomenon with its static information amount is shown in above-described Tables 4 and 5.

The clearness of each phenomenon with respect to each conclusion can be expressed generally by the following formula.

$$Cl_{ij} = Ifi_S / \sum_{i=1(A_{ij}\neq 0)}^{m} Ifi_S \qquad (59)$$

where $$A_{ij} = \sum_{k=1}^{p} m_{ij}(xi_k) \qquad (60)$$

In other words:

If a membership function exists for phenomenon fi with respect to conclusion cj, then $A_{ij} > 0$.

If a membership function does exist for phenomenon fi with respect to conclusion cj, then $A_{ij} = 0$.

The denominator of equation (59), which expresses the clearness of each phenomenon with respect to each conclusion, takes the sum of the static information amounts $Ifi_S$ for only those phenomena fi for which there exists a membership function with respect to conclusion cj.

Storage device 221 stores the clearness of each phenomenon in the same manner as previously described for device 21 of FIG. 1.

Similarly, the clearness addition device 222 operates similarly to device 22 of FIG. 1.

The clearness with respect to the result of an inference (i.e., the clearness of each conclusion) can be calculated in a general way by means of the following formula.

$$Cl_j = \sum_{i=1}^{m} Cl_{ij} \qquad (61)$$

In formula (61), the clearness $Cl_{ij}$ of phenomenon fi for which input data xi have not been received will be treated as 0. That is, only those clearnesses $Cl_{ij}$ for which input data xi have been received will be summed by formula (61).

The clearness of the result of inference $Cl_j$ will be in the range of:

$$0.0 \leq Cl_j \leq 1.0$$

In other words, when data are input for all the phenomena which, according to the knowledge stored prior to the inference, can be used to draw a conclusion, and an inference is made, the clearness of that conclusion will be 1.0. If data are input for only some of the phenomena which can be used to draw a conclusion, the clearness will be a value between 0.0 and 1.0. If, from among the usable phenomena, many phenomena with high clearness are used, then the clearness of the conclusion will be high. Here, it can be said that the inference made will be highly reliable.

The clearness display 223 displays the clearness of an inference result similarly to that described for element 23 of FIG. 1.

The third embodiment of this invention is an expanded version of a fuzzy inference device which is designed for the case in which the knowledge of an expert user concerning the relationship between phenomena and a conclusion expresses the fact that discrete phenomena related to a single conclusion are conjoined by OR; or the case in which the expert knowledge expresses the fact that discrete phenomena related to a single conclusion are conjoined by AND.

The apparatus arrangement shown in FIG. 6 accurately describes the second embodiment. In the following, only those aspects of the third embodiment which differ from those of the first and second embodiments are discussed. All element numbers will refer to the device shown in FIG. 6.

The knowledge of two experts including both OR and AND relationships is accepted by the storage device 211 in the following way.

Expert ex1:

If $0 \leq f1 \leq 40$ or $60 \leq f2 \leq 90$ or $10 \leq f3 \leq 40$ and $40 \leq f4 \leq 70$ and $20 \leq f5 \leq 60$, then c1    (62)

If $40 \leq f1 \leq 80$ or $50 \leq f2 \leq 80$, $30 \leq f3 \leq 60$ and $70 \leq f4 \leq 100$ and $20 \leq f6 \leq 50$, then c1    (63)

Expert ex2:

If $10 \leq f1 \leq 30$ or $70 \leq f2 \leq 80$ or $20 \leq f3 \leq 30$, $50 \leq f4 \leq 60$ and $30 \leq f5 \leq 50$, then c1    (64)

If $50 \leq f1 \leq 70$ or $60 \leq f2 \leq 70$, $40 \leq f3 \leq 50$ and $80 \leq f4 \leq 90$ and $30 \leq f6 \leq 40$, then c2    (65)

This type of expert knowledge will be stored in storage device 211 in the following data configuration. Tables 11 and 12 below both show the knowledge of expert ex1 which was expressed in (62) and (63).

TABLE 11

(Phenomenon Data)

| | f1(0) | | f1(1) | | ... |
|---|---|---|---|---|---|
| | Minimum Value | Maximum Value | Minimum Value | Maximum Value | ... |
| f1 | 0 | 40 | 40 | 80 | ... |

| | f2(0) | | f2(1) | | ... |
|---|---|---|---|---|---|
| | Minimum Value | Maximum Value | Minimum Value | Maximum Value | ... |
| f2 | 60 | 90 | 50 | 80 | ... |

TABLE 11-continued (Phenomenon Data)

| | f3(0) | | f3(1) | | ... |
|---|---|---|---|---|---|
| | Minimum Value | Maximum Value | Minimum Value | Maximum Value | ... |
| f3 | 10 | 40 | 30 | 60 | ... |

| | f4(0) | | f4(1) | | ... |
|---|---|---|---|---|---|
| | Minimum Value | Maximum Value | Minimum Value | Maximum Value | ... |
| f4 | 40 | 70 | 70 | 100 | ... |

| | f5(0) | | ... |
|---|---|---|---|
| | Minimum Value | Maximum Value | ... |
| f5 | 20 | 60 | ... |

| | f6(0) | | ... |
|---|---|---|---|
| | Minimum Value | Maximum Value | ... |
| f6 | 20 | 50 | ... |

TABLE 12

(Conclusion Data)

| c1(0) | f1(0) | f2(0) | f3(0) | ... |
|---|---|---|---|---|
| c1(1) | f4(0) | f5(0) | | ... |
| c2(0) | f1(1) | f2(1) | | ... |
| c2(1) | f3(1) | f4(1) | f6(1) | ... |

In Table 11, c1(0): Phenomena linked by OR related to conclusion c1.

c1(1): Phenomena linked by AND related to conclusion c1.

c2(0): Phenomena linked by OR related to conclusion c2.

c2(1): Phenomena linked by AND related to conclusion c2.

There are, of course, other data configurations which can be used to store the knowledge represented by formulas (62) through (65).

The knowledge stored in storage device 211 in the data configuration described above is synthesized by synthesizer 212 in the same way as in the first embodiment. The average and the standard deviation are found for minimum and maximum values input by multiple experts, and the synthesized data are stored in storage device 213 in the data configuration shown in Tables 13 and 14.

TABLE 13

(Synthesized Phenomenon Data)

| | f1(0) | | | | | f1(1) | | | | | ... |
|---|---|---|---|---|---|---|---|---|---|---|---|
| | Minimum Values | | Maximum Values | | | Minimum Values | | Maximum Values | | | |
| | Mean | Standard Deviation | Mean | Stan. Dev. | No. of Experts | Mean | Stan. Dev. | Mean | Stan. Dev. | No. of Experts | ... |
| f1 | 5 | 5 | 35 | 5 | 2 | 45 | 5 | 75 | 5 | 2 | ... |

| | f2(0) | | | | | f2(1) | | | | | ... |
|---|---|---|---|---|---|---|---|---|---|---|---|
| | Minimum Values | | Maximum Values | | | Minimum Values | | Maximum Values | | | |
| | Mean | Standard Dev. | Mean | Stan. Dev. | No. of Experts | Mean | Stan. Dev. | Mean | Stan. Dev. | No. of Experts | ... |
| f2 | 65 | 5 | 85 | 5 | 2 | 55 | 5 | 75 | 5 | 2 | ... |

| | f3(0) | | | | f3(1) | | | | ... |
|---|---|---|---|---|---|---|---|---|---|
| | Minimum Values | | Maximum Values | | Minimum Values | | Maximum Values | | |
| | Mean | Stan. Dev. | Mean | No. of Experts | Mean | Stan. Dev. | Mean | No. of Experts | ... |
| f3 | 15 | 5 | 35 | 2 | 35 | 5 | 55 | 2 | ... |

| f4(0) | | | f4(1) | | ... |
|---|---|---|---|---|---|

TABLE 13-continued (Synthesized Phenomenon Data)

| | Minimum Values | | Maximum Values | | No. of Experts | Minimum Values | | Maximum Values | | No. of Experts | ... |
|---|---|---|---|---|---|---|---|---|---|---|---|
| f4 | 45 | 5 | 65 | 5 | 2 | 75 | 5 | 95 | 5 | 2 | ... |

| | f5(0) | | | | | | | | | | |
|---|---|---|---|---|---|---|---|---|---|---|---|
| | Minimum Values | | Maximum Values | | | | | | | | ... |
| | Mean | Standard Deviation | Mean | Stan. Dev. | No. of Experts | | | | | | ... |
| f5 | 25 | 5 | 55 | 5 | 2 | | | | | | ... |

| | f6(0) | | | | | | | | | | |
|---|---|---|---|---|---|---|---|---|---|---|---|
| | Minimum Values | | Maximum Values | | | | | | | | ... |
| | Mean | Standard Deviation | Mean | Stan. Dev. | No. of Experts | | | | | | ... |
| f6 | 25 | 5 | 45 | 5 | 2 | | | | | | ... |

TABLE 14

(Synthesized Conclusion Data)

| c1(0) | f1(0) | f2(0) | f3(0) | ... |
| c1(1) | f4(0) | f5(0) | | ... |
| c2(0) | f1(1) | f2(1) | | ... |
| c2(1) | f3(1) | f4(1) | f6(1) | ... |

Let us assume that according to the expert knowledge concerning conclusion c1, phenomena f1, f2 and f2 are linked by OR. Let us call the grades of these phenomena with respect to a membership function at the time input data are received for each phenomenon $m_{11}$, $m_{12}$ and $m_{13}$, respectively. The grade $m_{1OR}$ of the group as a whole with respect to the membership function is obtained by calculating their MAX. That is, $$m_{1OR} = \text{MAX}(m_{11}, m_{21}, m_{31})$$

Let us also assume that according to the expert knowledge concerning conclusion c2, phenomena f1 and f2 are linked by OR. Let us call the grades of these phenomena with respect to a membership function at the time input data are received for each of them $m_{12}$ and $m_{22}$, respectively. The grade $m_{2OR}$ of the OR-linked group is obtained by the following formula:

$$m_{2OR} = \text{MAX}(m_{12}, m_{22}) \tag{67}$$

Let us now consider the grade of a group composed of a number of phenomena conjoined in the same way by AND.

Let us assume that phenomena f4 and f5 are linked by AND according to the expert knowledge concerning conclusion c1. Let us call the grades of these phenomena with respect to a membership function at the time input data are received for each of them $m_{41}$ and $m_{51}$, respectively. The grade $m_{1AND}$ of the AND-linked group is obtained by calculating their MIN. That is, $$m_{1AND} = \text{MIN}(m_{41}, m_{51}) \tag{68}$$

Let us assume that according to the expert knowledge concerning conclusion c1, phenomena f3, f4 and f5 are linked by AND in the same way. Let us call the grade of phenomena f3, f4 and f6 with respect to a membership function at the time input data are received for each phenomenon $m_{32}$, $m_{42}$ and $m_{62}$, respectively. The grade $m_{2AND}$ of the group as a whole with respect to the membership function is obtained by the following formula:

$$m_{2AND} = \text{MIN}(m_{32}, m_{42}, m_{62}) \tag{69}$$

The grade calculation device 215 calculates the grade $m_{ij}$ of input data associated with phenomena to membership functions by applying those data to the corresponding functions. It also calculates the grade of each group of data according to formulas (66) through (69).

If, according to expert knowledge concerning a single conclusion, a number of definitions exist for a single phenomenon in such a way as to be joined by OR, the grade of the phenomena will be calculated according to the aforementioned formula (51). The grade of each group can be calculated by using these grades in the aforesaid formulas (66)–(69).

The fuzzy information amount of each phenomenon is calculated by device 217 in the same way as in the second embodiment. We shall call the fuzzy information amounts of phenomena f1, f2, f3, f4, f5 and f6 If$1_D$, If$2_D$, If$3_D$, If$4_D$, If$5_D$ and If$6_D$, respectively.

The weight $w_{1OR}$, with respect to conclusion c1, of a group of phenomena joined by OR according to expert knowledge is calculated in the following way:

$$w_{1OR} = \frac{If1_D + If2_D + If3_D}{If1_D + If2_D + If3_D + If4_D + If5_D + If6_D} \tag{70}$$

Similarly, the weight $w_{2OR}$, with respect to conclusion c2, of a group of phenomena joined by OR according to expert knowledge is calculated in the following way:

$$w_{2OR} = \frac{If1_D + If2_D}{If1_D + If2_D + If3_D + If4_D + If5_D + If6_D} \tag{71}$$

The weight $w_{1AND}$, with respect to conclusion c1, of a group of phenomena joined by AND according to expert knowledge concerning conclusion c1 is calculated in the following way:

$$w_{1AND} = \frac{If4_D + If5_D}{If1_D + If2_D + If3_D + If4_D + If5_D + If6_D} \tag{72}$$

Similarly, the $w_{2AND}$, with respect to conclusion c2, of a group of phenomena joined by AND according to expert knowledge concerning conclusion c2 is calculated in the following way:

$$w_{2AND} = \frac{If3_D + If4_D + If6_D}{If1_D + If2_D + If3_D + If4_D + If5_D + If6_D} \quad (73)$$

The possibility of a conclusion is calculates as follows.

The possibility of conclusion c1:

$$Pr_1 = w_{1OR} \times m_{1OR} + w_{1AND} \times m_{1AND} \quad (74)$$

The possibility of conclusion c2:

$$Pr_2 = w_{2OR} \times m_{2OR} + w_{2AND} \times m_{2AND} \quad (75)$$

The structure and operation of the following components are identical to those shown in the aforesaid second embodiment: input device 214 for phenomenon values; calculation device 216 to determine fuzzy information amount; possibility display 218; calculation device 220 to determine clearness; clearness storage device 221; addition device 222 to total the clearnesses; and clearness display 223.

In both the second and third embodiments, each of the aforesaid devices 211 through 223 can be realized by means of a computer with a memory and a display. Specifically, knowledge synthesizer 212 and calculation devices 214, 217, 218, 220 and 222 would be ideally realized by a CPU operating in accordance with a program.

Although only preferred embodiments are specifically illustrated and described herein, it will be appreciated that variations of the present invention are possible in light of the above teachings and within the purview of the appended claims without departing from the spirit and intended scope of the invention.

What is claimed is:

1. A fuzzy inference apparatus comprising: an input device for entering input data relating to phenomena;
   a storage device for storing knowledge of expert users expressing relationships between phenomena and conclusions as a plurality of membership functions;
   a grade calculating device for determining a grade measure for said input date with respect to each of said plurality of membership functions stored in said storage device;
   a fuzzy information amount calculating device for calculating a fuzzy information amount for each phenomenon using said grade measures;
   a relational coefficient calculating device for calculating a relational coefficient for each conclusion which expresses the relatedness of multiple of said phenomena and said conclusion using said grade measures; and
   a possibility calculating device for performing fuzzy inferences on said phenomena to determine a possibility of a conclusion using said grade measures, said fuzzy information amounts and said relational coefficients.

2. A fuzzy inference apparatus, comprising: an input device for entering input data relating to phenomena;
   a storage device for storing knowledge of expert users expressing relationships between phenomena and conclusions as a plurality of membership functions, whereby said relationships can include a case in which a single phenomenon, for which a single conclusion is to be drawn, has two or more separate definitions which are conjoined in an OR relationship, said two or more definitions being represented by at least two membership functions;
   a grade calculating device for calculating a grade measure of said input data with respect to each of said plurality of membership functions for a given conclusion, wherein when a single phenomenon, for which a conclusion is to be drawn, has two or more separate definitions which are conjoined in an OR relationship, a grade measure of said input data is produced for each of said two or more of membership functions representing said two or more definitions;
   a fuzzy information amount calculating device for calculating a fuzzy information amount for each said phenomenon using said grade measures; and
   a possibility calculating device for performing fuzzy inferences to determine a possibility of a conclusion using said grade measures and said fuzzy information amounts.

3. The fuzzy inference apparatus of claim 2, wherein said grade calculation performed by said grade calculation device is a MAX calculation.

4. The fuzzy inference apparatus of claim 3, wherein said plurality of membership functions in said storage device can include relationships in which various multiple phenomena are related to a single conclusion are conjoined in an OR relationship; wherein said grade calculating device further produces a grade for each group of said phenomena which are conjoined in an OR relationship and wherein said possibility calculating device determines the possibility of a conclusion using said grade measures, said grade for each said group, and said fuzzy information amounts.

5. The fuzzy inference apparatus of claim 2, wherein said knowledge is stored in said storage device in a form which expresses that two or more definitions of said single phenomenon are in an OR relationship.

6. The fuzzy inference apparatus of claim 2, further comprising a clearness calculating means comprising:
   a static information amount calculating device for calculating a static information amount for each phenomenon based on said plurality of membership functions;
   a static calculating device for calculating the clearness of each phenomenon with respect to each conclusion using said static information amounts;
   an adding device for calculating the clearness of each conclusion by adding together the clearnesses of the phenomena relating to said input data for a given conclusion; and
   a clearness storage device for storing the clearness calculation.

7. A fuzzy inference apparatus comprising: an input device for entering input data relating to phenomena;
   a storage device for storing knowledge of expert users which expresses relationships between phenomena and conclusions as a plurality of membership functions, wherein said knowledge can include relationships of multiple phenomena to a single conclusion which are conjoined in an OR relationship;
   a grade calculating device for determining a grade measure for said input data with respect to each of said plurality of membership functions stored in said storage device and for determining a grade for each group of said phenomena which are conjoined in an OR relationship;

a fuzzy information amount calculating device for calculating a fuzzy information amount for each phenomenon using said grade measures; and a possibility calculating device for calculating the possibility of a conclusion using said grade measures, said grade for each of said groups, and said fuzzy information amounts.

8. The fuzzy inference apparatus of claim 7, wherein said grade calculating device produces said grade measure using a MAX calculation.

9. The fuzzy inference apparatus of claim 7, wherein said storage device stores said knowledge in a form which expresses that various multiple phenomena about which a single conclusion is to be drawn are in an OR relationship.

10. A fuzzy inference apparatus comprising: an input device for entering input data related to phenomena;

a storage device for storing knowledge of expert users expressing relationships between phenomena and conclusions as a plurality of membership functions, wherein said relationships include various multiple phenomena about which a single conclusion is to be drawn conjoined in an OR relationship and also include multiple phenomena and conclusions conjoined in an AND relationship;

a grade calculating device for determining a grade measure for said input data with respect to each of said plurality of membership functions, for determining a first grade for a group of phenomena conjoined in an OR relationship, and for determining a second grade for another group of phenomena conjoined in an AND relationship;

a fuzzy information amount calculating device for calculating the fuzzy information amount for each phenomenon using said grade measures; and a possibility calculating device for calculating the possibility of a conclusion using said grade measures, said first grade, said second grade and said fuzzy information amounts.

11. The fuzzy inference apparatus of claim 10, wherein said grade calculating device determines said first grade for said group of phenomena conjoined in an OR relationship in a MAX calculation and determines said second grade for said group of phenomena conjoined in an AND relationship in a MIN calculation.

12. The fuzzy inference apparatus of claim 10, wherein said storage device stores said knowledge in a form which expresses said phenomena conjoined in an OR relationship and said phenomena conjoined in an AND relationship.

13. The fuzzy inference apparatus of claim 10, further comprising a clearness device which comprises:

a static information amount calculating device for calculating a static information amount for each phenomenon based on said membership functions;

a clearness calculating device for calculating the clearness of each phenomenon with respect to each conclusion using said static information amounts; and an adding device for calculating a clearness of each said conclusion by adding together said clearnesses of said phenomena relating to said input data for a given conclusion; and a clearness storage device for storing the clearness calculation.

* * * * *